United States Patent [19]

Macander et al.

[11] Patent Number: 5,672,228

[45] Date of Patent: Sep. 30, 1997

[54] VIBRATION-DAMPING OF STRUCTURAL PRODUCTS

[75] Inventors: Aleksander B. Macander, Rockville, Md.; Thomas N. Tinley, Oakton, Va.; Steven S. Chiu, Gaithersburg, Md.

[73] Assignee: The United States of America as represented by the Secretary of the Navy, Washington, D.C.

[21] Appl. No.: 530,391

[22] Filed: Sep. 19, 1995

[51] Int. Cl.$^6$ ............................................. F04B 1/84
[52] U.S. Cl. ........................... 156/324; 52/144; 156/71; 428/906
[58] Field of Search ........................... 156/324, 184, 156/191, 193, 256, 71; 52/144; 428/906

[56] References Cited

U.S. PATENT DOCUMENTS

| | | |
|---|---|---|
| 3,767,500 | 10/1973 | Tally ............................... 156/324 |
| 4,728,831 | 3/1988 | Cheng ............................... 310/13 |
| 5,108,802 | 4/1992 | Sattinger ............................ 52/144 |
| 5,250,132 | 10/1993 | Lapp ................................ 156/175 |
| 5,342,465 | 8/1994 | Bronowicki ........................ 156/192 |
| 5,368,914 | 11/1994 | Barrett ............................. 428/201 |
| 5,552,209 | 9/1996 | McCutcheon ....................... 428/209 |

*Primary Examiner*—Daniel Stemmer
*Attorney, Agent, or Firm*—John Forrest; Jacob Shuster

[57] ABSTRACT

Vibration-damping layers are stored as a continuous elongated strap in coiled condition for supply to subsequently fabricated structural products. Such strap is formed from high modulus layer constrainment segments encapsulated within a viscoelastic material contributing to establishment of the vibration-damping property and flexure of the strap between the segments thereof to accommodate coiling during storage. The strap is uncoiled from its storage condition during a supply phase to a preselected surface of the fabricated structural product.

9 Claims, 2 Drawing Sheets

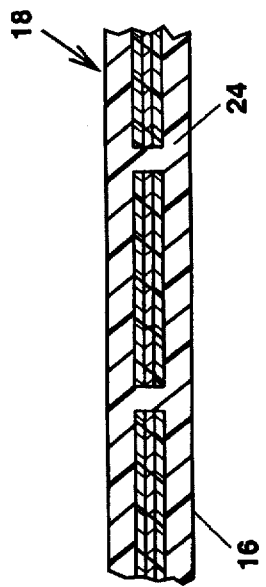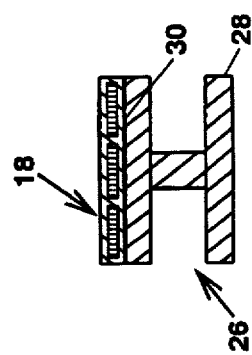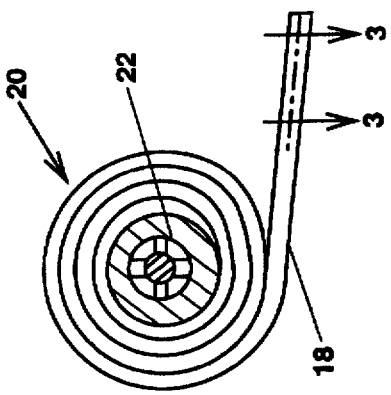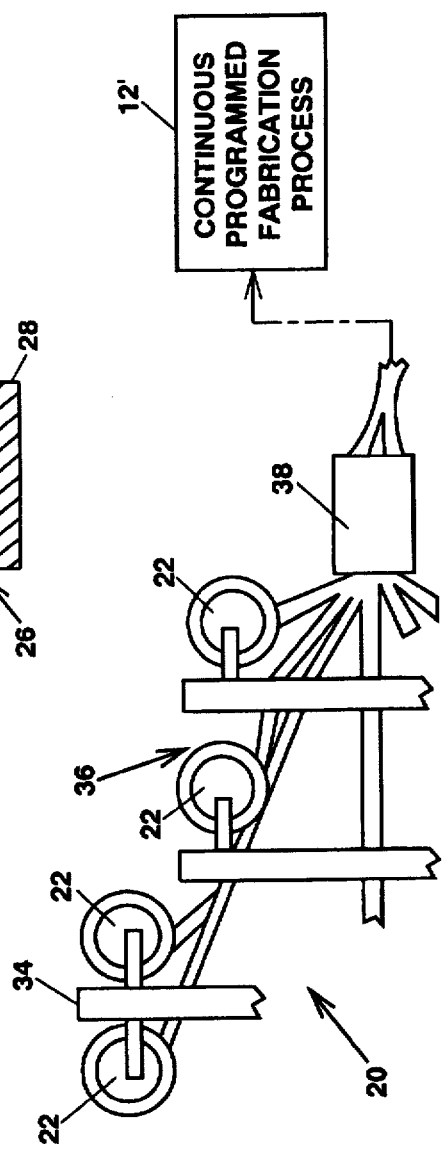
FIG. 2
FIG. 3
FIG. 5
FIG. 4

VIBRATION-DAMPING OF STRUCTURAL PRODUCTS

This invention relates generally to the fabrication of composite structural products having a vibration-damping property.

BACKGROUND OF THE INVENTION

Various noise silencing techniques have heretofore been utilized in connection with the construction of machines, equipment and structures from which noise is generated by vibrations. For example, noise radiation originates in naval vessels during operation of mechanical equipment therein, such as pumps, fans, turbines, compressors, etc., which excite foundations and support structures at resonant frequencies. The vibratory energy so generated propagates through the hull of the vessel and into surrounding exterior fluid with an elevated acoustic signature.

Some of the solutions heretofore proposed for silencing vibration induced noise included the stiffening of structural supports or foundations, mechanical isolation, balancing of rotors, use of dynamic vibration absorbers, resonance avoidance design, and add-on damping treatments for structural members. Add-on damping treatments involving vibration damped composite structural members having multi-segmented layers of high modulus constraining material and viscoelastic damping films are disclosed for example in U.S. Pat. Nos. 4,954,375 and 5,108,802 to Sattinger et al. The use of a structural material having an anti-vibration property, is disclosed for example in U.S. Pat. No. 4,087,289 to Gondo et al.

The foregoing prior art noise silencing techniques have limitations and disadvantages which include excessive cost, intolerable increase in weight and increased structural design complexity with costly monitoring and maintenance requirements.

It is therefore an important object of the present invention to provide a vibration damping treatment that is relatively simple and less costly for suppressing vibrations and noise, radiated for example from surface naval vessels, submarines or commercial vessels due to associated structural design.

SUMMARY OF THE INVENTION

In accordance with the present invention, a preselected surface of a structural member has a vibration-damping layer supplied thereto from a continuous strap uncoiled from a storage condition for application to a surface of the structural member. The strap is made of closely spaced constrainment segments encapsulated within a viscoelastic coating sheaf to provide both vibration damping for said surface on the structural product and accommodate flexure of the strap during storage into a coiled condition as the source of supply to the structural product either during the supply phase of the fabrication process or after the product is formed.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 2 is a side elevation view of the vibration-damping layer strap associated with the present invention, in its coiled storage condition;

FIG. 3 is an enlarged partial section view taken substantially through a plane indicated by section line 3—3 in FIG. 2;

FIG. 4 is a schematic side view of a coiled storage arrangement associated with one embodiment of the present invention; and FIG. 5 is a transverse section view of a typical composite or non-composite structural product of the present invention.

DETAILED DESCRIPTION OF PREFERRED EMBODIMENTS

Figure 1:
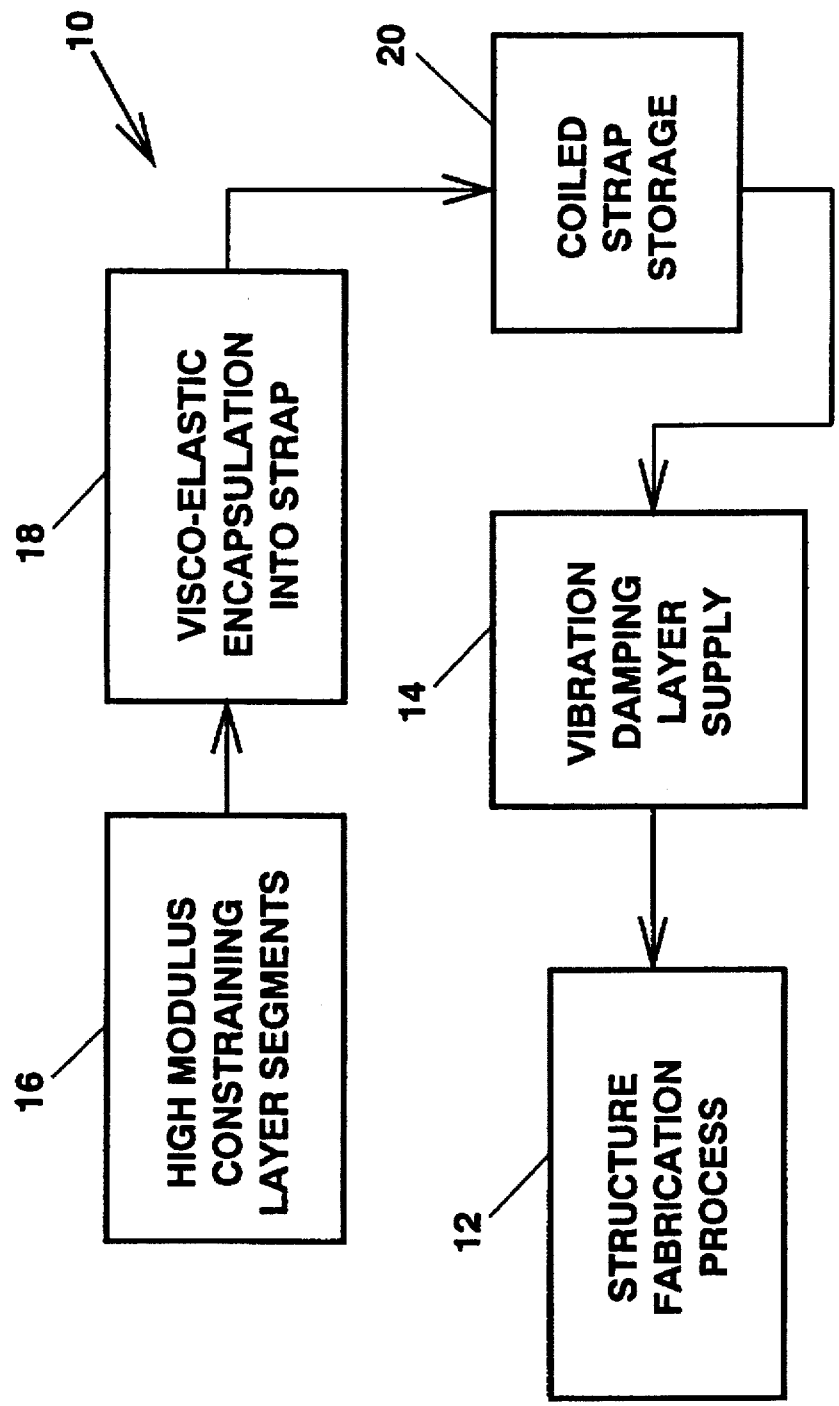
FIG. 1 is a block diagram schematically illustrating the add-on vibration-damping treatment of the present invention.

Referring now to the drawing in detail, FIG. 1 diagrams an add-on vibration-damping treatment pursuant to the present invention, generally referred to by reference numeral 10, associated with an otherwise known structure fabrication process 12. As designated in FIG. 1, a vibration-damping layer is formed before the structure fabrication process is initiated and is supplied to the product of such process as denoted by diagram block 14. Such vibration-damping layers are generally known in the art including high modulus constraining segments sandwiched between rubber-like base members, as disclosed in U.S. Pat. No. 5,108,802 to Sattinger aforementioned. Such high modulus constraining segments 16 as denoted in FIG. 1, are encapsulated within a viscoelastic material such as rubber, in accordance with conventional prior art vulcanization technology. However, pursuant to the present invention such encapsulation of the assembled segments is associated with the formation of the vibration-damping layer as a continuous elongated strap, denoted by diagram block 18 in FIG. 1. The elongated strap 18 is then stored in a coiled condition, as denoted by block 20, from which storage condition it is uncoiled for supply, as denoted by block 14, to the structure fabrication process 12.

Storage of the continuous elongated strap 18 in its coiled condition on a spool 22 is shown in FIG. 2. The construction of the strap 18 as a vibration-damping layer is illustrated by way of example in FIG. 3, showing closely spaced individual segments 16. Such segments are made of high modulus organic matrix composites reinforced with unidirectional or multidirectional fibers such as graphite, boron, steel, alumina, tungsten, etc., high modulus monolithic plate segments such as steel, tungsten, ceramics etc., or non-ferrous metal matrix fiber composites. These plate segments can be selectively distributed within the strap to create a mass loading effect while maintaining the high modulus requirement of the individual segments.

The segments 16 of strap 18 are encapsulated within a viscoelastic coating or sheaf 24 made of a flexible material such as rubber having a suitable energy dissipating property. Such viscoelastic sheaf 24 not only contributes to the vibration-damping property to be established for a structural product of the fabrication process 12, but also accommodates flexural bending of the strap 18 between the segments 16 so that it may be readily coiled during storage on the spool 22 as shown in FIG. 2.

A structural product 26 shown by way of example in FIG. 5, is a construction beam 28 made of steel or any structural composite. The beam 28 has a base surface 30 to which a section of the strap 18 is bonded as the vibration-damping layer. The fabrication of such a product 26, including integration of the vibration-damping layers 18 therein, is performed by the process 12 diagrammed in FIG. 1.

The fabrication process may also be of the continuous, computer automated type which is already generally known in the art. Such a computer controlled process has associated therewith pursuant to the present invention, a continuous supply of vibration-damping layers from storage 20, illustrated in greater detail in FIG. 4 by way of example. As also shown in FIG. 4, continuous straps 18 are coiled on spools 22 carried by a roving creel assembly 34 and a material guide assembly 36 of the storage from which the straps are uncoiled and received within an alignment guide assembly 38. The uncoiled straps are thereby fed as a preform in a continuous supply phase of the fabrication process 12', such as a pultrusion process generally known in the art.

As an alternative, the elongated straps 18 may be cut into discrete lengths independently of the fabrication process to which it is supplied as an add-on layer and secondarily bonded to preselected surface 30 of the structural product 26 in order to achieve vibration-damping, as shown in FIG. 5 by way of example.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a method for fabrication of a structural product including formation of a surface thereon and application of a vibration-damping layer to said surface, the improvement residing in the steps of: forming said vibration-damping layer as an elongated strap having constrainment segments therein encapsulated within a flexible coating prior to said formation of the surface on the structural product during fabrication thereof; storing the elongated strap in a coiled condition accommodated by flexure of said flexible coating; and supplying the structural product during said fabrication thereof with the elongated strap for application to said surface by uncoiling of the strap from storage in said coiled condition.

2. The combination of claim 1 wherein the constrainment segments are made of a high modulus material.

3. The combination of claim 2 wherein the flexible coating made of a viscoelastic material undergoes said flexure between the constrainment segments during said step of storing of the strap in the coiled condition.

4. The combination of claim 3 wherein said structural product comprises a construction beam having said surface thereon to which the vibration-damping layer is applied during said fabrication of the structural product.

5. The combination of claim 1 wherein the constrainment segments are made of a high modulus composite and the flexible coating is made of a viscoelastic material.

6. The combination of claim 1 wherein said method for fabrication of the structural product includes the steps of: cutting the uncoiled elongated strap into discrete lengths; and bonding said discrete lengths of the strap to said surface of the structural product.

7. The combination of claim 1 wherein the structural product is a construction beam on which said surface is formed separately from the vibration-damping layer applied thereto.

8. In combination with a method for fabrication of a structural product including formation of a surface having a vibration-damping layer thereon, the improvement residing in the steps of: forming said vibration-damping layer as an elongated strap having an outer flexible coating prior to formation of the surface during said fabrication of the structural product; storing the elongated strap in a coiled condition accommodated by flexure of the flexible coating; and uncoiling the elongated strap stored in said coiled condition for continuous supply during application to said surface of the structural product being fabricated.

9. The combination of claim 8 wherein the vibration-damping layer is formed from segments of a high modulus material encapsulated within said flexible coating made of a viscoelastic material.

* * * * *